United States Patent [19]
Rygmyr

[11] 3,953,923
[45] May 4, 1976

[54] METHOD OF MAKING HEATING DEVICE FOR LIQUIDS

[75] Inventor: H. Eugene Rygmyr, Winona, Minn.

[73] Assignee: Lake Center Industries, Winona, Minn.

[22] Filed: Dec. 9, 1974

[21] Appl. No.: 528,226

[52] U.S. Cl.............................. 29/611; 29/DIG. 3; 29/DIG. 47; 219/302
[51] Int. Cl.²......................................... H05B 3/00
[58] Field of Search.................. 29/611, 613, DIG. 3, 29/DIG. 47; 219/302, 303; 99/281, 288

[56] References Cited
UNITED STATES PATENTS

| | | | |
|---|---|---|---|
| 2,190,494 | 2/1940 | Templin | 29/DIG. 47 |
| 3,079,673 | 3/1963 | Loehlein et al. | 29/611 |
| 3,221,396 | 12/1965 | Bremer et al. | 29/611 |
| 3,665,598 | 5/1972 | Brieko | 29/611 |
| 3,711,681 | 1/1973 | Leuschner et al. | 219/283 X |

Primary Examiner—Victor A. Dipalma
Attorney, Agent, or Firm—Merchant, Gould, Smith, Edell, Welter & Schmidt

[57] ABSTRACT

A length of extruded heat-conductive metal forms an elongated body which defines a pair of spaced parallel holes extending longitudinally through the body. An elongated heating element extends longitudinally through one of the holes, and the body and heating element are bent about an axis extending transversely of the body into generally U-shape. The other hole in the body provides a passageway for fluid to be heated by the heating element. A method for making the heater involves the extruding of metal to provide a generally straight body having a pair of holes extending longitudinally therethrough, inserting a heating element through one of the holes for snug engagement with the body, and thereafter bending the body with the heating element in generally U-shape to cause tight heat transfer engagement of the heating element with the body.

4 Claims, 3 Drawing Figures

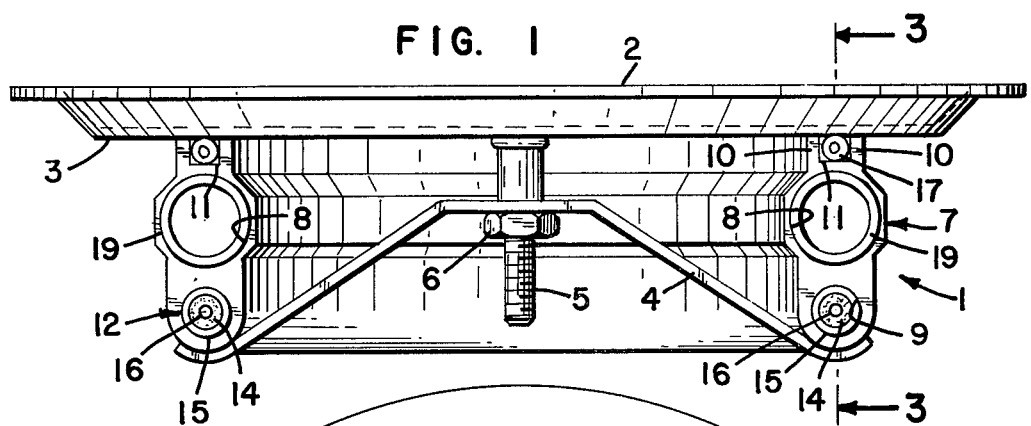
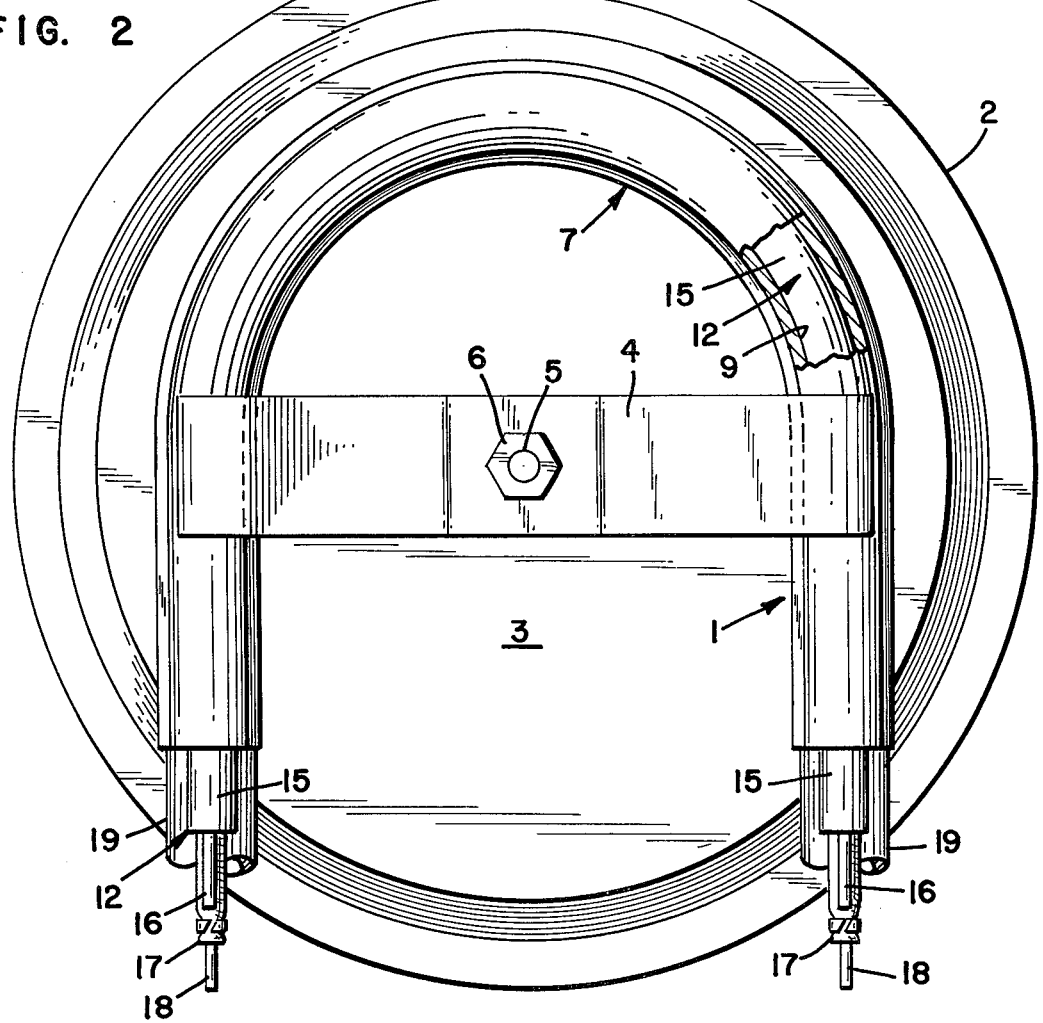
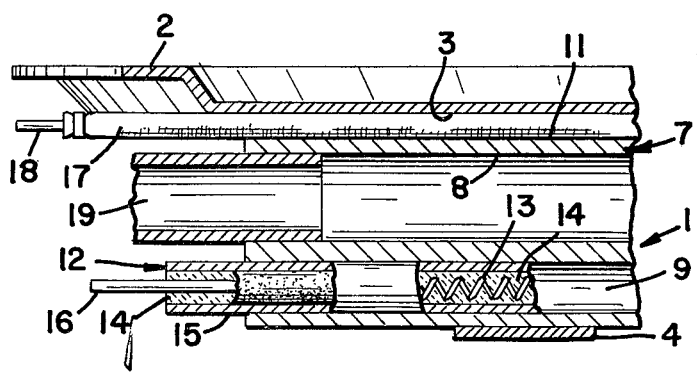

METHOD OF MAKING HEATING DEVICE FOR LIQUIDS

BACKGROUND OF THE INVENTION

This invention relates particularly to electrically operated heating devices for beverage brewing apparatus, such as coffee makers, wherein liquid, such as water, is heated as it flows through a passageway. Heretofore, such a passageway has been defined by a metallic tube mechanically mounted in a groove or channel formed in a supporting base, usually of cast metal such as aluminum. The base is usually formed to provide a second channel for a heating element in closely spaced relation to the liquid conducting tube, or the heating element is embedded in the base during casting or molding of the base. The mechanical mounting of the liquid conducting tube is usually accomplished by staking or peening the metal of the base against the tube at spaced apart points, and has resulted in rather unsatisfactory heat transfer from the heating element to liquid flowing through the tube.

An important object of this invention is the provision of a heating device for liquid including an extruded metallic body defining a pair of laterally spaced holes extending longitudinally therethrough, and a heating element extending through one of the holes, and including an arrangement wherein the heating element has tight surface engagement with the body for efficient transfer to the other one of the holes.

Another object of this invention is the provision of a heating device which is simple and inexpensive to produce.

Another object of this invention is the provision of a novel method for producing a heating device for liquids.

To these ends, I provide a heating device comprising an elongated extruded body of metal having high heat conductivity, the body defining a pair of spaced parallel holes extending longitudinally therethrough, and an elongated heating element extending longitudinally through one of the holes, the other one of the holes providing a passageway for liquid to be heated. The body and heating element are curved intermediate their ends about an axis extending in a direction transversely with respect to the body into generally U-shape. The body further defines a transversely opening channel that extends longitudinally of the body for reception of a second heating element, the liquid receiving passageway being disposed between the heating elements.

In carrying out the method for producing the heating device of this invention, I provide the steps of, extruding metal, such as aluminum, to provide a generally straight elongated body having a pair of spaced parallel holes extending longitudinally through the body, inserting an elongated heating element through one of the holes for snug fit therein, and thereafter bending the body and heating element intermediate their ends, about an axis extending transversely with respect to the body, into generally U-shape.

DESCRIPTION OF THE DRAWINGS

FIG. 1 is a view in side elevation of a heating device produced in accordance with this invention, and mounted against the bottom surface of the heating plate;

FIG. 2 is a view in bottom plan, some parts being broken away and some parts being shown in section; and FIG. 3 is a fragmentary section taken on the line 3—3 of FIG. 1.

DETAILED DESCRIPTION OF THE PREFERRED EMBODIMENT

The heater of this invention is preferably of the type used in apparatus for preparing heated beverages, such as coffee, and particularly for such coffee makers which utilize the drip method of preparing coffee. In certain varieties of such coffee makers, cold water is poured into a reservoir from whence it flows through a heated tube to be brought to the desired temperature before being introduced to the ground coffee bean. The heater of this invention indicated in its entirety by the reference numberal 1 is shown as underlying a pan or plate 2 and held against the bottom surface 3 thereof by means of a clamping bar 4 mounted on a stud 5 and held in place thereon by a nut 6. The stud 5 is suitably fixed to the bottom surface of the plate 2 and extends axially downwardly therefrom, as shown in FIG. 1. The plate 2 is a portion of the coffee maker, not shown, and is normally used for supporting a container for brewed coffee, not shown.

The heater 1 comprises an elongated body 7 of extruded metal, such as aluminum, having efficient thermal conductivity. The body 7 defines a pair of laterally spaced parallel holes 8 and 9 that extend longitudinally therethrough, the hole 8 being of larger diameter than the hole 9. Further, the body 7 is formed to provide a laterally spaced pair of longitudinally extending ribs or flanges 10 which form the opposite sides of a laterally outwardly opening channel 11 that extends longitudinally of the body 7, the hole 8 being disposed intermediate the hole 9 and the channel 11.

An elongated heating element 12 comprises an electrical resistance heater wire 13 that is embedded in suitable insulating material 14, preferably of the ceramic type, contained within a metalic jacket or tube 15. At its opposite ends, the heater wire 13 is connected to lead-in wires 16 that extend outwardly of the opposite ends of the jacket 15 for connection of a source of electrical current not shown. The jacket or tube 15 is of a diameter which enables the heating element 12 to be inserted into the hole 9, and to fit snuggly therein, with the opposite ends of the tube or jacket 15 projecting upwardly from opposite ends of the body 7, the lead-in wires 16 extending axially outwardly from the opposite ends of the tube 15.

As shown particularly in FIG. 2, the elongated body 7, with the heating element 12 therein, is bent into generally U-shape, the clamping bar 4 engaging diametrically opposite portions of the body 7 to securely hold the same against the bottom surface 3 of the plate 2. A second elongated heating element 17 is mounted in the channel 11 so as to engage the bottom surface 3 of the plate 2, and is preferably used to maintain liquid in a container supported by the plate 2 at desired drinking temperature, as is usual with beverage makers, such as coffee makers. The heating element 17 is similar to the heating element 12, and includes a pair of lead-in wires 18 projecting axially from the opposite ends thereof, for connection to a source of electrical current.

A pair of tubular conduits 19 each have one end projecting into a different end of the hole 8 and tightly fitted therein, for conducting relatively cool water to one end of the hole 8 and heated water away from the opposite end of the hole 8. Although not shown, it will be appreciated that one of the tubes or conduits 19 extends from the usual cool water reservoir in the coffee maker to the body 7, the other tube 19 extending from the opposite end of the body 7 to a point overlying a quantity of ground coffee for delivery of the heated water thereto.

A preferred method of producing the heater of this invention comprises the steps of, extruding a length of heat conductive material, such as aluminum, to provide a generally straight elongated body having a pair of laterally spaced parallel holes extending longitudinally therethrough, inserting the assembled heating element 12 longitudinally through the hole 9, and thereafter bending the intermediate portion of the body 7 with the heating element 12 therein, about an axis extending transversely with respect to the body 7, into an arcuate curve, so that the body 7 and heating element 12 therein are formed into generally U-shape. As the body 7 and heating element 12 are thus bent or curved, the transverse dimensions of the holes 8 and 9, in a direction generally radially of the curve or bend, tend to become reduced, so that the heating element 12 is tightly gripped within the hole 9 to provide efficient heat transfer between the heating element 12 and the body 7. In view of the fact that the heating element 17 is utilized primarily to warm the pan 2, it may be placed in the channel 11 after the body 7 has been bent into U-shape and during assembly of the body 7 to the plate 2.

By providing a heater as above described, I have achieved several advantages over heaters previously used for the purpose set forth. One of these is that an extruded body is less expensive to produce and uses somewhat less material than a cast or a molded body for a similar heating application. Secondly, by bending the body into U-shape with the heating element 12 therein, more efficient heat transfer is obtained between the heater and the liquid passing through the body is obtained. Thirdly, by providing the body 7 with the liquid conducting hole or passageway 8, the need for a separate liquid tube staked or peened into a channel in the body, is eliminated, thereby eliminating the earlier cause of poor heat transfer to the liquid.

while I have disclosed a preferred form of my heater for liquids, and a preferred method of producing the heater, it will be understood that the same is capable of modification without departure from the spirit and scope of invention, as defined in the claims.

What is claimed is:

1. The method of producing a heater for liquid comprising:
   a. extruding a length of heat conductive material to provide a generally straight elongated body having a pair of laterally spaced parallel holes extending longitudinally therethrough;
   b. inserting an elongated heating element longitudinally through one of said holes in snug fitting engagement with said body;
   c. and thereafter bending at least a portion of said body and heating element between the ends thereof about an axis extending transversely with respect to said body into an arcuate curve, whereby to reduce the transverse dimension of said one of the holes in at least one direction, so that said heating element is tightly gripped by said body within said one of the holes.

2. The method defined in claim 1 including the forming of a laterally outwardly opening longitudinal channel in said body during the extrusion thereof, and thereafter disposing a second elongated heating element in said channel.

3. The method defined in claim 2 in which said body is bent into generally U-shape.

4. The method defined in claim 3 comprising the extruding of said metal so that the other one of said holes is disposed between said one of the holes and said channel.

* * * * *